United States Patent
Shih et al.

(10) Patent No.: US 10,022,971 B2
(45) Date of Patent: Jul. 17, 2018

(54) AUTOMATIC INKJET HEAD CLEANING METHOD FOR POWDER BED AND INKJET 3D PRINTER

(71) Applicants: XYZPRINTING, INC., New Taipei (TW); KINPO ELECTRONICS, INC., New Taipei (TW)

(72) Inventors: Hsueh-Kuan Shih, New Taipei (TW); Chih-Hung Lin, New Taipei (TW)

(73) Assignees: XYZPRINTING, INC., New Taipei (TW); KINPO ELECTRONICS, INC., New Taipei (TW)

( * ) Notice: Subject to any disclaimer, the term of this patent is extended or adjusted under 35 U.S.C. 154(b) by 0 days.

(21) Appl. No.: 15/496,849

(22) Filed: Apr. 25, 2017

(65) Prior Publication Data

US 2018/0170058 A1   Jun. 21, 2018

(30) Foreign Application Priority Data

Dec. 16, 2016 (CN) .......................... 2016 1 1167868

(51) Int. Cl.
*B41J 2/165* (2006.01)
(52) U.S. Cl.
CPC ....... *B41J 2/16535* (2013.01); *B41J 2/16538* (2013.01)

(58) Field of Classification Search
CPC ................... B41J 2/16535; B41J 2/16538
See application file for complete search history.

(56) References Cited

U.S. PATENT DOCUMENTS

| 2006/0061613 A1* | 3/2006 | Fienup | B41J 2/16532 347/19 |
| 2007/0091140 A1* | 4/2007 | Taga | B41J 2/165 347/30 |

* cited by examiner

*Primary Examiner* — Jason Uhlenhake
(74) *Attorney, Agent, or Firm* — Chun-Ming Shih; HDLS IPR Services

(57) ABSTRACT

An automatic inkjet head cleaning method for a powder bed and inkjet 3D printer is provided, and the method includes steps: controlling a powder-laying module and a plurality of the inkjet heads of the powder bed and inkjet 3D printer to print a 3D physical model according to 3D printing data; retrieving a status value continuously or intermittently during printing; executing the first cleaning procedure for cleaning all or parts of the inkjet heads when determining the status value satisfies the first cleaning configuration value; and executing the second cleaning procedure for cleaning all or parts of the inkjet heads when determining the status value satisfies the second cleaning configuration value. The method automatically cleans the inkjet heads during the printing process, which effectively improves printing quality and reduces printing failure rates.

20 Claims, 13 Drawing Sheets

AUTOMATIC INKJET HEAD CLEANING METHOD FOR POWDER BED AND INKJET 3D PRINTER

BACKGROUND OF THE INVENTION

Field of the Invention

The technical field relates to a powder bed and inkjet 3D printer, and more particularly relates to an automatic inkjet head cleaning method for a powder bed and inkjet 3D printer.

Description of Prior Art

There is a powder bed and inkjet 3D printer available in the market. The current powder bed and inkjet 3D printer lays a layer of powder during printing; controls multiple inkjet heads to eject inks and adhesives for coloring and sticking the powders together in order to generate a single layer slicing model; and lays another layer of powder on the slicing model as well as controls multiple inkjet heads again to eject inks and adhesives in order to generate another slicing model. The above mentioned operation steps are repeated constantly to form a 3D physical model stacked by a plurality of slicing model.

According to the prior art, each inkjet head has to frequently print during printing processes. Frequently, the nozzles of the inkjet heads of the prior art powder bed and inkjet 3D printers are blocked by ink residues, the inkjet heads fail to print either after heated for extended time periods or due to excess printing frequencies, or the inkjet head fails because the nozzles are clogged by the sticking powers.

Consequently, the coloring or the adhesion of a 3D physical model may fail during printing which lead to inferior printing quality or printing failures.

SUMMARY OF THE INVENTION

The present disclosed example is directed to an automatic inkjet head cleaning method for powder bed and inkjet 3D printer where the method automatically executes cleaning procedures of different levels on inkjet heads when determining that different cleaning conditions are satisfied. One of the exemplary embodiments, an automatic inkjet head cleaning method applicable to a powder bed and inkjet 3D printer comprising a plurality of inkjet heads and a powder-laying module, the automatic inkjet head cleaning method comprising following steps: a) controlling the plurality of the inkjet heads and the powder-laying module to print a 3D physical model according to 3D printing data at the powder bed and inkjet 3D printer; b) retrieving a status value continuously or intermittently during printing; c) executing a first cleaning procedure for cleaning all or parts of the inkjet heads when the status value satisfies a first cleaning configuration value; and, d) executing a second cleaning procedure for cleaning all or parts of the inkjet heads when the status value satisfies a second cleaning configuration value, wherein a first execute time period used in executing the first cleaning procedure is longer than a second execute time period used in executing the second cleaning procedure.

The method according to the present disclosed example automatically cleans the inkjet heads during the printing process, which effectively improves printing quality and reduces printing failure rate.

The following paragraphs detail the description of the embodiment according to the present disclosed example accompanying with drawings, but the scope of the present disclosed examples are not limited thereto.

BRIEF DESCRIPTION OF DRAWING

The features of the disclosed example believed to be novel are set forth with particularity in the appended claims. The disclosed example itself, however, may be best understood by reference to the following detailed description of the disclosed example, which describes an exemplary embodiment of the disclosed example, taken in conjunction with the accompanying drawings, in which:

DETAILED DESCRIPTION OF THE INVENTION

In cooperation with attached drawings, the technical contents and detailed description of the disclosed example are described thereinafter according to a preferable embodiment, being not used to limit its executing scope. Any equivalent variation and modification made according to appended claims is all covered by the claims claimed by the present disclosed example.

Figure 1:
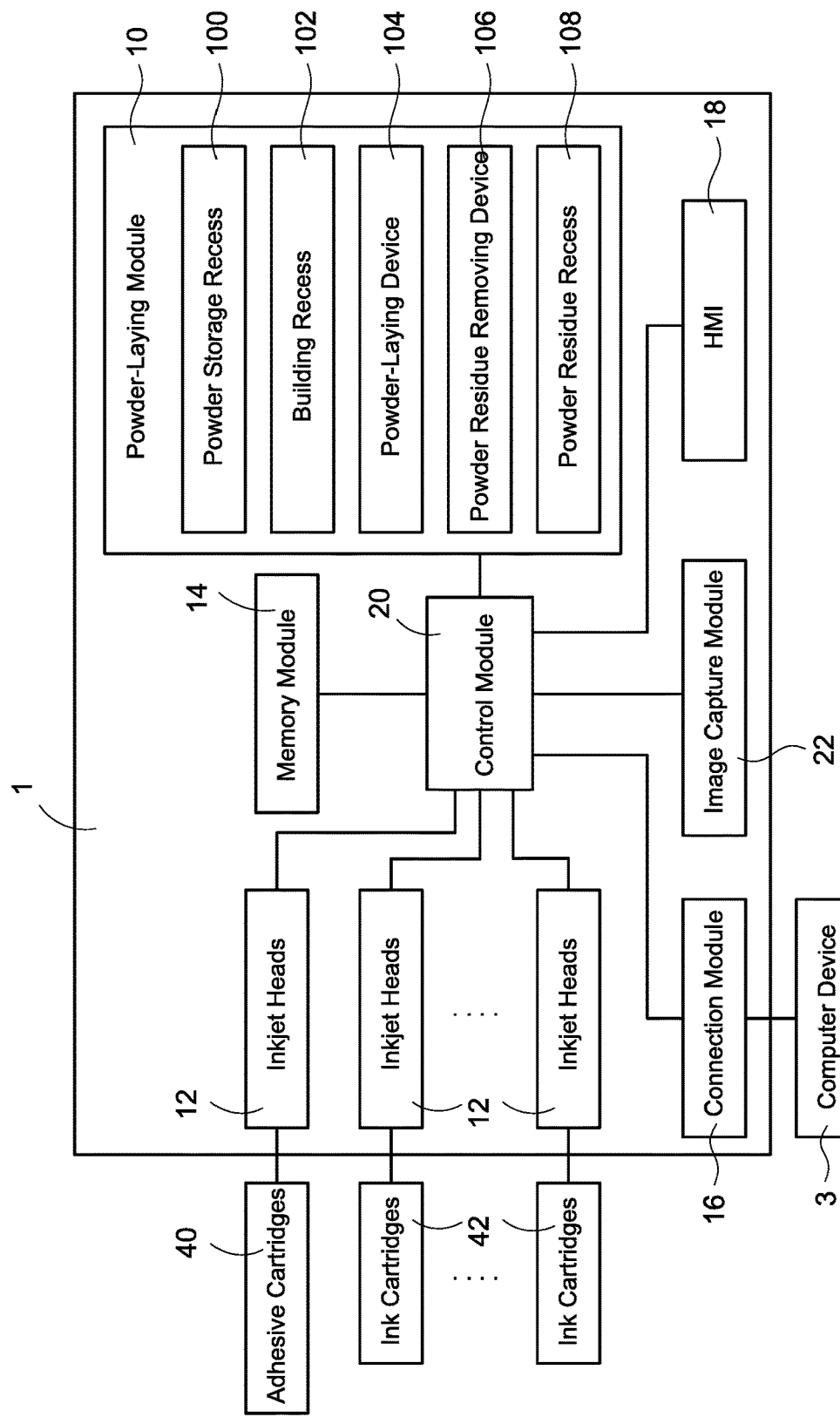
FIG. 1 is an architecture diagram of a powder bed and inkjet 3D printer according to the present disclosed example.

FIG. 1 is an architecture diagram of a powder bed and inkjet 3D printer according to the present disclosed example. The disclosed example discloses a powder bed and inkjet 3D printer 1 (referred as the 3D printer 1 in the following description), which is used for generating 3D physical model with powder inkjet printing technology. In addition, 3D printer 1 automatically cleans inkjet heads during printing to avoid inferior printing quality caused by clogged inkjet heads. Furthermore, the 3D printer 1 executes cleaning operation of different levels on inkjet heads when the 3D printer 1 detects that different cleaning conditions are satisfied (i.e. the current status value of the 3D printer 1 satisfies different cleaning configuration values).

Specifically, when a user want to print a set of monochrome or color 3D objects represented by digital data, the user executes a slicing application at a computer device 3 to execute a slicing process so as to divide the above mentioned 3D object into multiple slicing objects and execute a transforming application to perform an analysis process on the multiple slicing objects in order to generate 3D printing data used for printing controls. Lastly, the user uses the computer device 3 to transfer the above mentioned 3D printing data to the 3D printer 1 to generate the 3D physical model materialized from the 3D object.

In the embodiment, the 3D printer 1 comprises a powder-laying module 10, multiple inkjet heads 12, a memory module 14, a connection module 16, an HMI 18 and a control module 20 electrically coupled to the above mentioned components.

The powder-laying module 10 and inkjet heads 12 together are used for printing. In an embodiment, the powder-laying module 10 comprises a powder storage recess 100, a building recess 102, a powder-laying device 104, a powder residue recess 106 and a powder residue removing device 108.

The multiple inkjet heads 12 respectively connect to adhesive cartridges 40 with adhesives and ink cartridges 42 with inks. In an embodiment, when the 3D printer 1 supports color printing, the multiple inkjet heads 12 respectively connects to multiple ink cartridges 42 of different colors (for example cyan, magenta, yellow and black).

The memory module 14 is used for data storage (for example the above mentioned 3D printing data). The connection module 16 (for example an USB module, a PCI bus module, a WIFI module or a blue tooth module) is used for connecting to a computer device 3, and receiving 3D printing data from the computer device 3. The HMI 18 (for example a keyboard, a display, an indicator, a buzzer or any combination of the above mentioned devices) is used for receiving user operating instructions and outputting associated printing data.

The control module 20 is used for controlling print based on 3D printing data, and automatically controlling the inkjet heads 12 to execute corresponding cleaning procedures when any cleaning condition is satisfied.

Figure 2A:
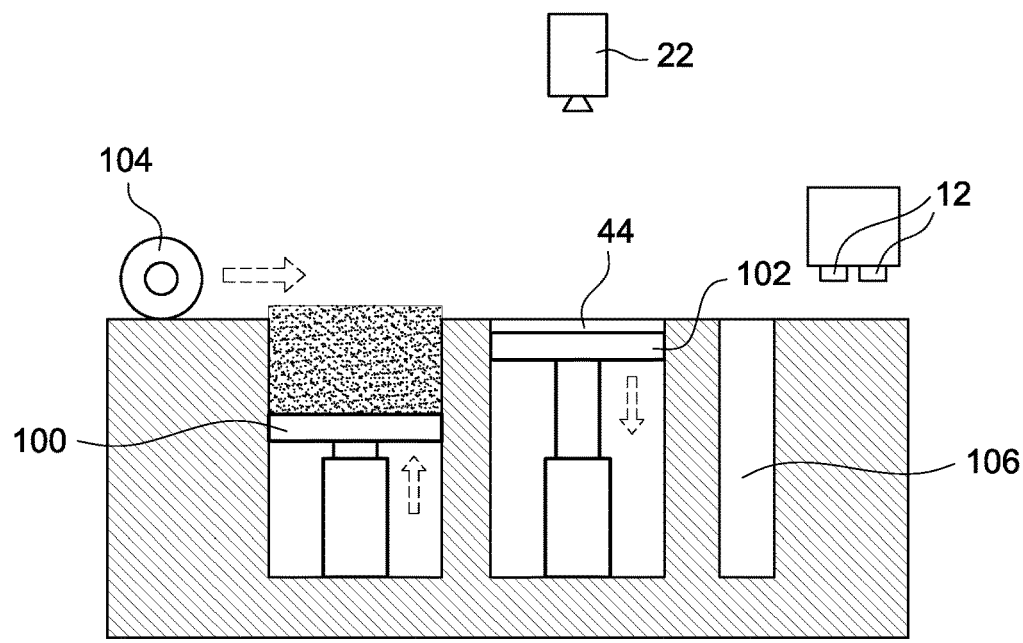
FIG. 2A is a first printing schematic diagram of the powder bed and inkjet 3D printer according to the present disclosed example.
Figure 2B:
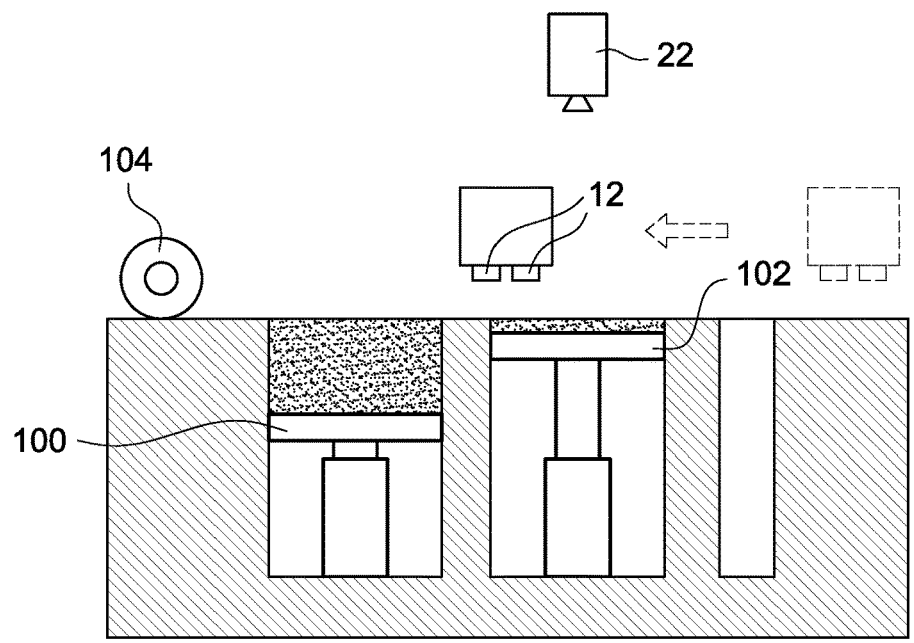
FIG. 2B is a second printing schematic diagram of the powder bed and inkjet 3D printer according to the present disclosed example.
Figure 2C:
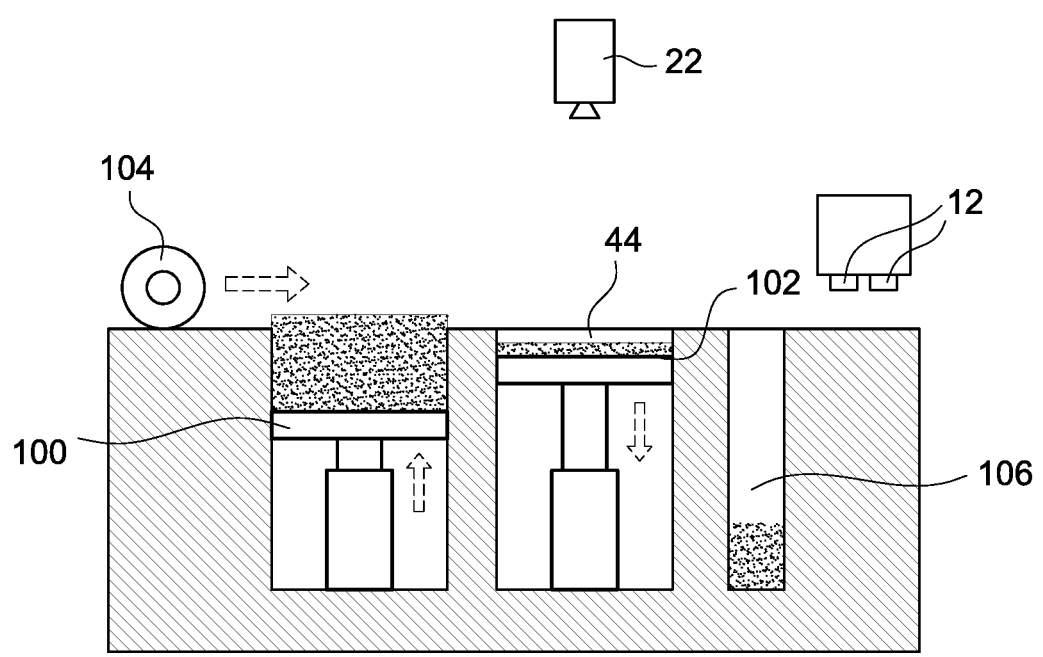
FIG. 2C is a third printing schematic diagram of the powder bed and inkjet 3D printer according to the present disclosed example.

Refer to FIG. 2A to 2C, FIG. 2A is a first printing schematic diagram of the powder bed and inkjet 3D printer according to the present disclosed example; FIG. 2B is a second printing schematic diagram of the powder bed and inkjet 3D printer according to the present disclosed example; and FIG. 2C is a third printing schematic diagram of the powder bed and inkjet 3D printer according to the disclosed example. The diagrams are used for illustrating how the 3D printer 1 generates a 3D physical model.

The powders used for forming the model are stored in the powder storage recess 100. After start printing, the control module 20 controls the powder storage recess 100 to move upward in order to provide a layer of powders 44, controls the building recess 102 to move downward, and controls the powder-laying device 104 to push the layer of powders 44 into a space generated after the building recess 102 moves downward so as to lay a layer of powders (as shown in FIG. 2A).

Next, the control module 20 controls the multiple inkjet heads 12 to print the adhesive and the ink on the layer of powders 44 according to the 3D printing data to color the layer of powders and bind the layer of powders with adhesion to generate a layer of slicing physical model (as shown in FIG. 2B).

Next, the control module 20 controls the powder storage recess 102 to move downward in order to provide a space receiving another layer of powders 44, controls the building recess 100 to move upward to provide another layer of powders 44, and controls the powder-laying device 104 to push the layer of powders 44 into the building recess 102 so as to lay another layer of powders (as shown in FIG. 2C). The above mentioned operation steps are repeated constantly to form a 3D physical model stacked by multiple slicing models.

Furthermore, when the control module 20 determines all slicing physical model are printed, the control module 20 controls the powder residue removing device 108 to remove power residues on the building recess 102 (for example by blowing or washing), and keep the powder residues in the powder residue recess 106.

Figure 3:
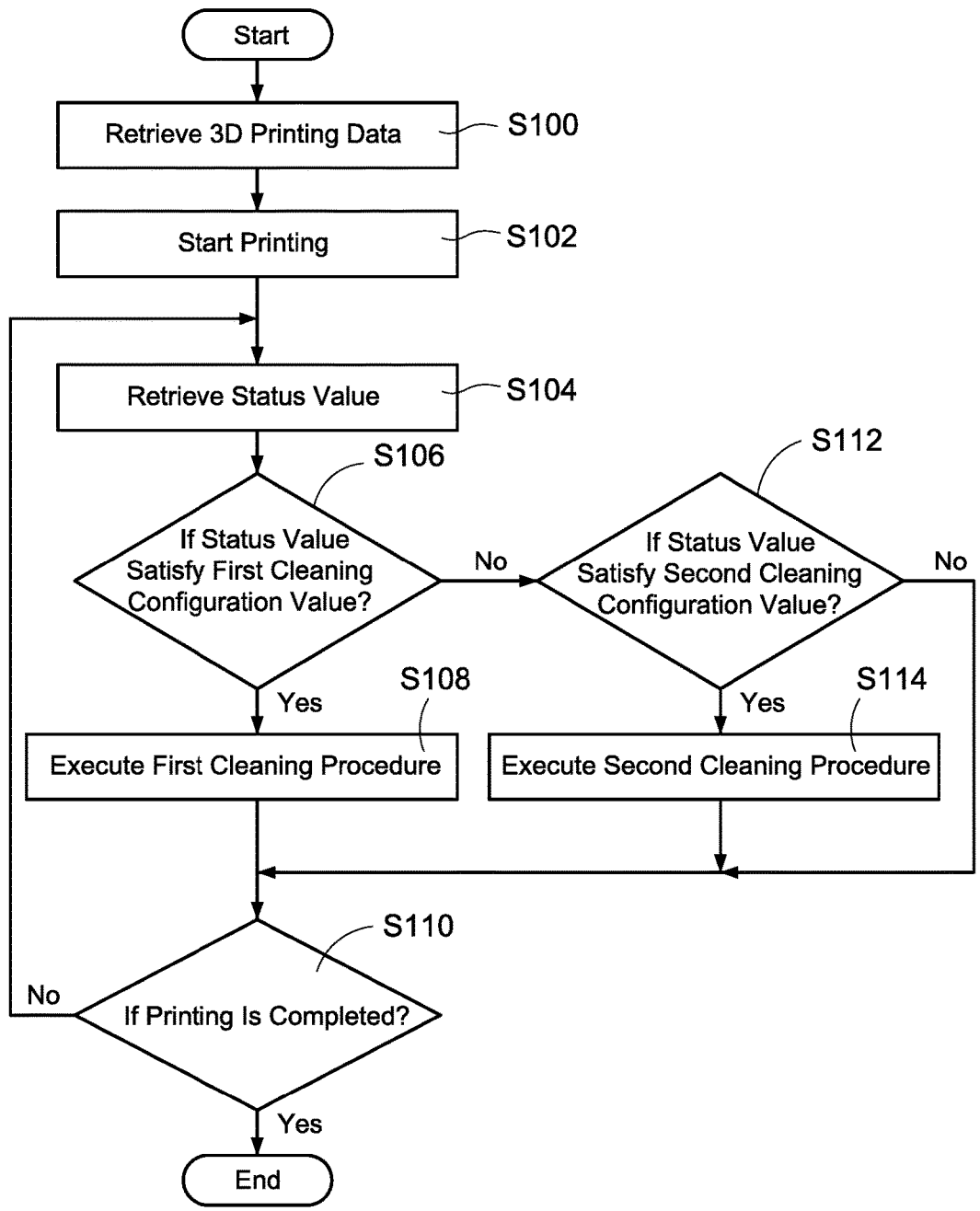
FIG. 3 is a flowchart of an automatic inkjet head cleaning method according to the first embodiment of the present disclosed example.

FIG. 3 is a flowchart of an automatic inkjet head cleaning method according to the first embodiment of the disclosed example. In the embodiment, the automatic inkjet head cleaning method is used in a 3d printer 1 as shown in FIG. 1. In the embodiment, the 3D printer 1 selectively chooses one out of two cleaning procedures of different cleaning levels according to the current status. In the embodiment, the automatic inkjet head cleaning method comprises the following steps.

Step S100: the control module 20 retrieves 3d printing data. In an embodiment, the control module 20 reads the 3D printing data from the memory module 14, or receives the 3D printing data from the computer device 3 via the connection module 16.

Step S102: the control module 20 controls the multiple inkjet heads 12 and the powder-laying module 10 according to the retrieved 3D printing data to start repeating the step flows as shown from FIG. 2A to 2C in order to print the 3D physical model by layers.

In an embodiment, the 3D printing data is comprised of multiple instructions (such as G-code), and the control module 20 controls the multiple inkjet heads 12 and the powder-laying module 10 to execute corresponding actions so as to print the corresponding 3D physical model after execute the above mentioned multiple printing control instructions.

Step S104: during the printing process, the control module 20 continuously or consecutively retrieves the control module status value (for example the elapsed time or the status of 3d printer 1, and the status includes the printed layers of the slicing physical model, the printing frequency of each inkjet heads 12, the consumed ink quantity of each ink cartridges 42 or other status).

In an embodiment, the control module 20 retrieves the latest status values upon a predetermined timing period elapsed (for example 30 seconds), or retrieves the latest status values upon detecting a predetermined event occurred (for example the predetermined layers of the slicing physical model is printed or the current printing control instruction executed by the control module 20 is an interrupt instruction).

Next, the control module 20 reads the pre-saved multiple cleaning configuration values (i.e. the first cleaning configuration value and the second cleaning configuration value in the embodiment) from the memory module 14, and determines if the status value satisfies any configuration value (indicating the next executing step is Step S106 or Step S112). In other words, determines if the current status is in accordance with any cleaning required status.

Step S106: the control module 20 determines if the status value satisfy the first cleaning configuration value, which means determines if the current status is in accordance with the first kind of cleaning required status.

If the control module 20 determines that the status value satisfies the first cleaning configuration value, and executes Step S108. Or the control module 20 executes Step S112.

Step S108: the control module 20 executes the first cleaning procedure corresponding to the first cleaning configuration value to clean all or parts of the inkjet heads 12.

Step S110: the control module 20 determines if the 3D physical model is printed (i.e. If all the slicing physical models are printed). In an embodiment, the control module 20 determines the printing is completed upon all the printing control instructions for printing the 3D printing data is executed.

If the control module 20 determines the printed is not completed, the control module 20 continues the printing and executes Step S104. Or, the control module 20 controls the 3D printer 1 to finish printing.

Step S112: if the determined status value by the control module 20 in Step S106 does not satisfy the first cleaning configuration value, then executes Step S112: the control module 20 determines if the status value satisfies the second cleaning configuration value, which means determines if the current status is in accordance with the second kind of cleaning required status.

If the control module 20 determines that the status value satisfies the second cleaning configuration value, executes Step S114. Or the control module 20 executes Step S110.

Step 114: the control module 20 executes the second cleaning procedure corresponding to the second cleaning configuration value for cleaning all or parts of the inkjet heads 12.

It should be note that each above mentioned controls all or specific inkjet heads 12 (for example clogged inkjet heads 12) to execute scrapping action so as to scrape the ink residues, adhesive residues or powders, or print with a predetermined ink or adhesive quantity in order to clear ink pipes and inkjet heads.

In an embodiment, the multiple cleaning procedures are distinguished by the quantities of inkjet heads used for cleaning, the frequencies of executing the cleaning operations (such as printing actions or scrapping actions) or the ink quantity used in each print.

In an embodiment, the first cleaning configuration value corresponds to the enhanced cleaning required status, the second cleaning configuration value corresponds to the mild cleaning required status, wherein the first cleaning configuration value is not lower than the second cleaning configuration value, but the scope is not limited thereto.

In addition, compares with the second cleaning procedure, the first cleaning procedure executes cleaning operations with higher frequency on more inkjet heads 12 (i.e. the first cleaning frequency of the first cleaning procedure is higher than the second cleaning frequency of the second cleaning procedure) or print with more inks. Therefore, compare with the second cleaning procedure, the first cleaning procedure is more effective in unclogging inkjet heads. In addition, the execute time (i.e. The first execute time) or the consumed ink quantity required by the first cleaning procedure is more than the execute time (i.e. The second execute time) or the consumed ink quantity required in the second cleaning procedure by the 3D printer 1.

It should be note that when the control module 20 execute Steps S104, S106 or S112, the 3D printer 1 continues to print the 3D physical model; and when the control module 20 executes Steps S108 or S114, the 3D printer 1 stops printing the 3D physical model in order to execute the cleaning procedure, and continues to print the 3D physical model after the cleaning procedures are completed.

In an embodiment, the control module 20 stops printing the 3D physical model and executes Step S104, and continues to print the 3D physical model after determines that the cleaning procedure is not required (the result is no in Step S112) or the cleaning procedures are executed (Step S108, S114).

The method of the disclosed example automatically cleans the inkjet heads during the printing process, which effectively and immediately resolves the inkjet head clogging, improves printing quality and reduces printing failure rates.

In addition, compares with the executing cleaning procedures of the same level regularly, the method of the disclosed example executes cleaning procedures of different levels based on different status values where the required time and the ink quantity to execute the cleaning procedure is less when the inkjet head clogging is not serious, and also effectively clear the inkjet heads when the inkjet head clogging is serious.

Figure 4:
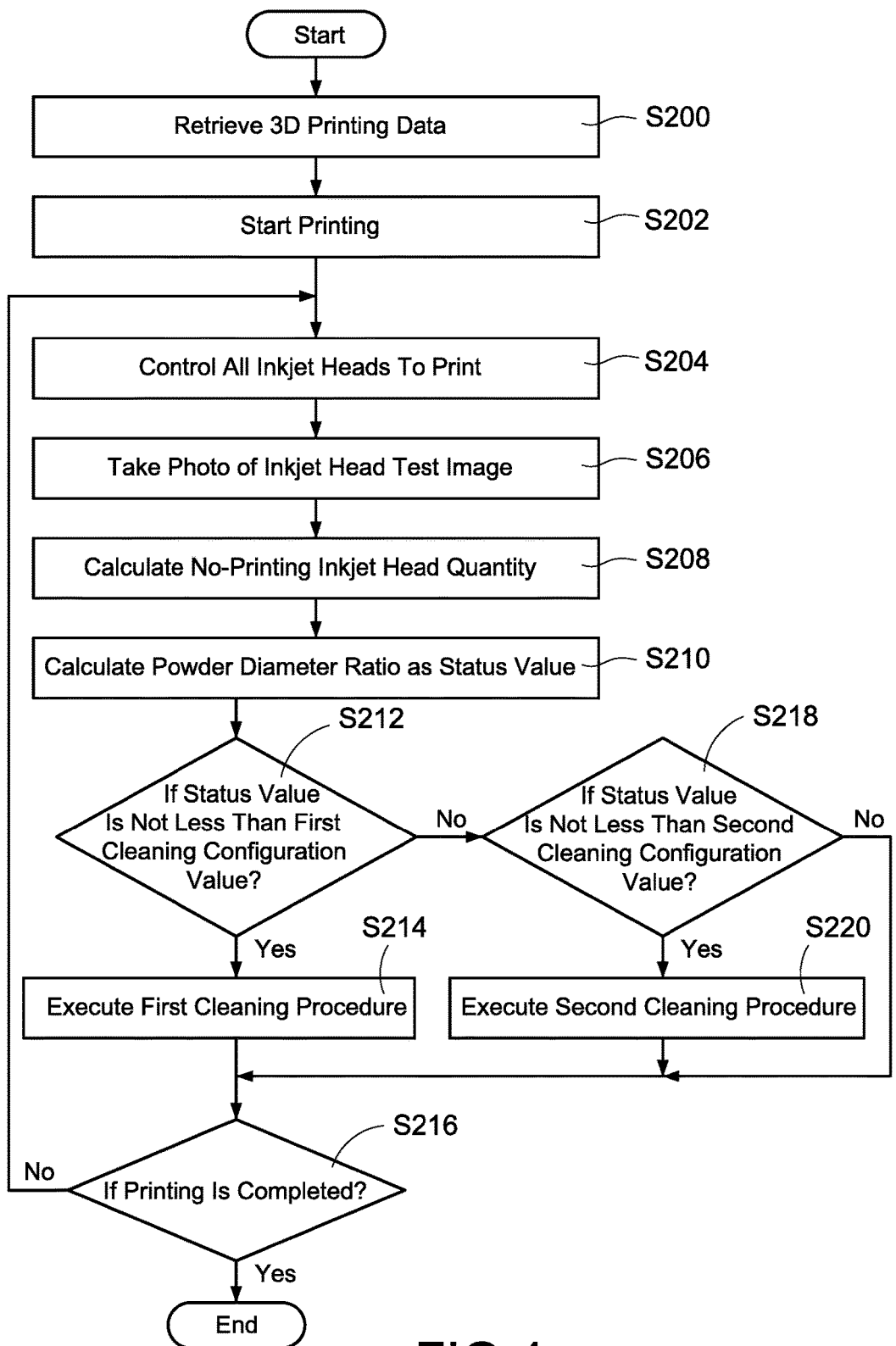
FIG. 4 is a flowchart of automatic inkjet head cleaning method according to the second embodiment of the present disclosed example.

FIG. 4 is a flowchart of an automatic inkjet head cleaning method according to the first embodiment of the present disclosed example. In the embodiment, the Steps S200, S202, S214, S216 and S220 are respectively identical or similar to Steps S100, S102, S108, S110 and S114 as shown in the first embodiment in FIG. 3 and the details are not repeated here. The following description focuses on illustrating the differences between two embodiments. In the embodiment, the status value is the powder diameter ratio, the first cleaning configuration value and the second cleaning configuration value respectively correspond to the predetermined powder diameter ratios of different cleaning required status. In addition, in the embodiment, the first cleaning configuration value is higher than the second cleaning configuration value, which means the first cleaning configuration value is the enhanced cleaning ratio, the second cleaning configuration value is the mild cleaning ratio, the first cleaning procedure is the enhanced cleaning procedure, and the second cleaning procedure is the mild cleaning procedure.

In addition, in the embodiment, the 3D printer 1 further comprises the image capture module 22 electrically connected to the control module 20. The image capture module 22 is used for taking photos of the operation status of the multiple inkjet heads 12 as a reference to the control module 20 to determine if the cleaning procedure is required. In an embodiment, the image capture module 22 is disposed above the building recess 102 (as shown in FIG. 2A to 2C) to take photos of the operation status of the multiple inkjet heads 12.

The control module 20 executes Step 204 after Steps S200 and S202 are executed, and controls all the inkjet heads 12 above the building recess 102 to print with inks or adhesives to start executing an inkjet head test.

Figure 5:
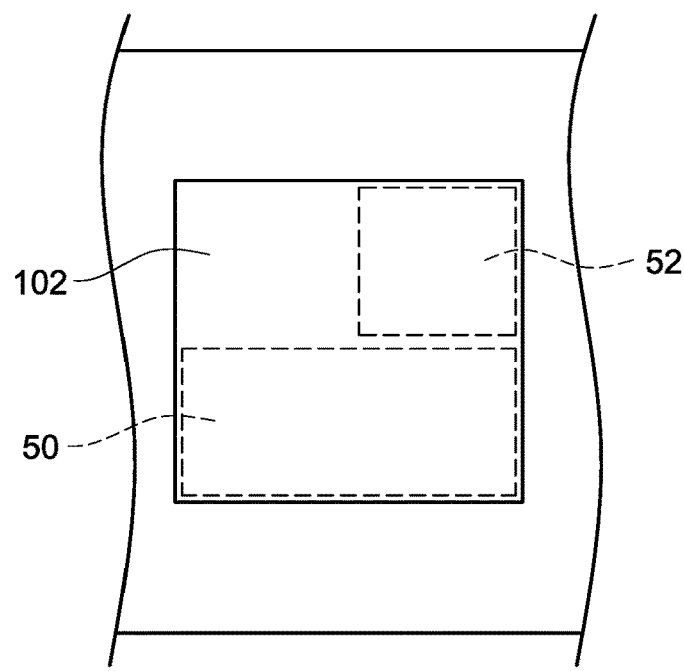
FIG. 5 is a building recess top view of the powder bed and inkjet 3D printer according to the present disclosed example.
Figure 6:
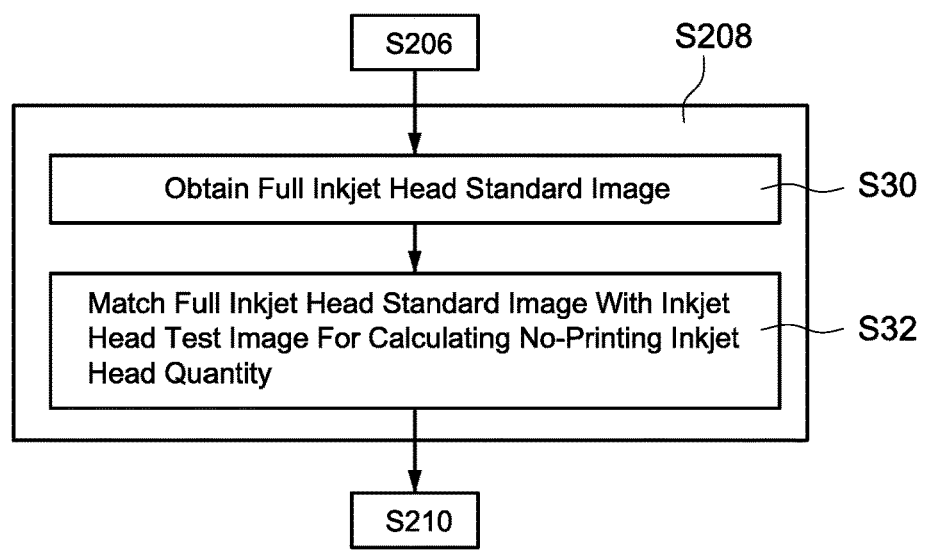
FIG. 6 is a partial flowchart of the automatic inkjet head cleaning method according to the third embodiment of the present disclosed example.

FIG. 5 is a building recess top view of the powder bed and inkjet 3D printer according to the present disclosed example. In an embodiment, the building recess 102 is divided into a printing area 50 and an invalid area 52. The 3D printer 1 prints the 3D physical model within the printing area 50, and executes the inkjet head test to print with inks or adhesives in the invalid area 52.

Figure 7A:
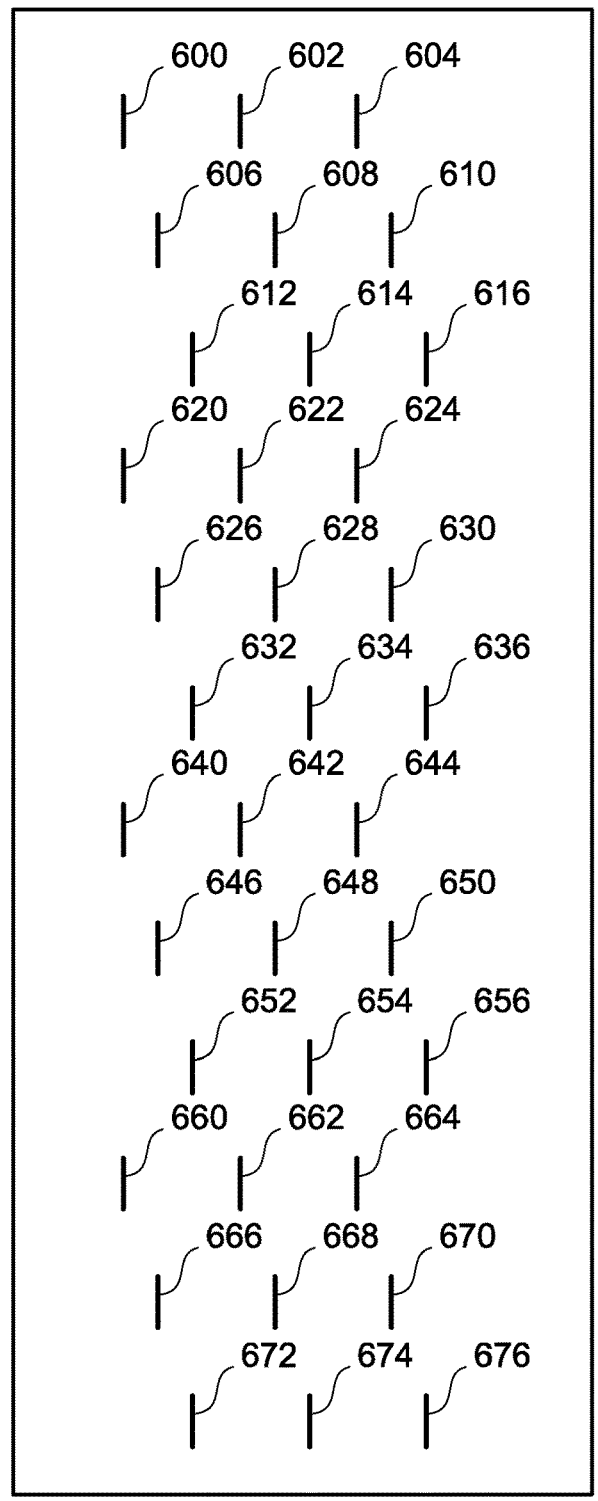
FIG. 7A is a schematic diagram of a full inkjet head standard image according to the present disclosed example.
Figure 7B:
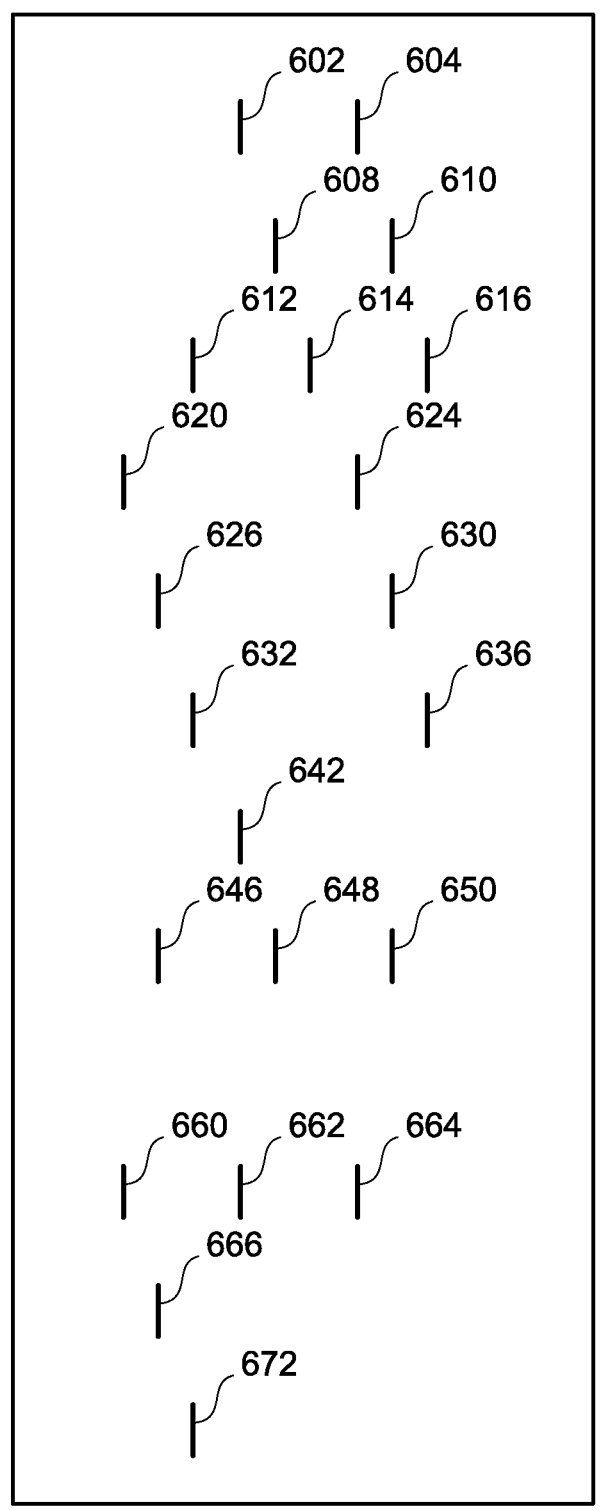
FIG. 7B is a schematic diagram of an inkjet head test image according to the present disclosed example.

Specifically, in Step 204, the control module 20 controls the powder-laying module to lay a new layer of powders (as shown in FIG. 2A), and controls each inkjet head to print predetermined patterns or lines in the invalid area 52 (as shown in FIG. 7A or 7B).

The method of the disclosed example effectively prevents the printing failure caused by the inks and adhesives printed during the inkjet heads test from spattering on the 3D physical model under printing.

Step S206: the control module 20 takes photos of the building recess 102 via the image capture module 22 to retrieve the inkjet head test image.

Step S208: the control module 20 calculates the quantity of no-printing and partial printing inkjet heads (referred as no-printing inkjet head quantity) according to the inkjet heads test image taken.

In an embodiment, the control module 20 calculates the quantity of inkjet heads which are no-printing or partial printing inkjet heads and aligned consecutively as the no-printing inkjet head quantity.

Furthermore, the control module 20 considers the multiple inkjet heads connected to the ink cartridge of the same color as a group, calculates and compares the no-printing inkjet head quantities among groups, then uses the maximum no-printing inkjet head quantity as the final no-printing inkjet head quantity to execute Step S210.

Step S210: the control module 20 calculates the powder diameter ratio as the status value according to the no-printing inkjet head quantity, the estimated printing resolution and the powder diameter.

In an embodiment, the setup profile of the 3D printing data or the 3D printer 1 comprises the above mentioned printing resolution and powder diameter, and the control module 20 calculates the powder diameter ratio based on the following formula (1).

$$R = \frac{(r \times N)}{S} \quad \text{formula (1)}$$

Wherein, R is the powder diameter ratio; r is the printing resolution; N is the no-printing inkjet head quantity; S is the powder diameter.

For example, given the printing resolution is 1600 dpi (dots per inch), the powder diameter ratio is 67 μm, the continuous no-printing inkjet head quantity of the cyan ink cartridge is 5, the continuous no-printing inkjet head quantity of the magenta ink cartridge is 3, the continuous no-printing inkjet head quantity of the yellow ink cartridge is 2, and the continuous no-printing inkjet head quantity of the black ink cartridge is 6. The maximum no-printing inkjet head quantity determined by the control module 20 is 6, and the power diameter ratio is 1.42 based on the above mentioned formula (1).

Step S212: the control module 20 reads the predetermined first cleaning configuration value (for example three multiples), and compares the calculated status value with the first cleaning configuration value.

Specifically, when the control module 20 determines that the status value is not lower than the first cleaning configuration value, the control module 20 executes the corresponding first cleaning procedure (Step S214), continues to print the 3D physical model after the cleaning procedure is completed and determines if the printing is completed.

If the control module 20 determines the status value is lower than the first cleaning configuration value, then executes Step S218: the control module 20 reads the predetermined second cleaning configuration value (for example 1 multiple), and compares the calculated status value with the second cleaning configuration value.

Specifically, when the control module 20 determines that the status value is not lower than the first cleaning configuration value, the control module 20 executes the corresponding second cleaning procedure (Step S220), continues to print the 3D physical model after the cleaning procedure is completed and determines if the printing is completed (S216).

By taking the printing resolution and the powder diameter into consideration in calculating the powder diameter ratio, the influence of the no-printing inkjet head quantity on the overall visual of the 3D physical model is quantified, and the execute time of cleaning procedures under different levels is effectively determined. Accordingly, the printing status of the inkjet heads is kept stable so as to provide stable printing quality.

Refer to FIGS. 4, 6, 7A and 7B, FIG. 6 is a partial flowchart of the automatic inkjet head cleaning method according to the third embodiment of the present disclosed example; FIG. 7A is a schematic diagram of a full inkjet head standard image according to the present disclosed example; and FIG. 7B is a schematic diagram of an inkjet head test image according to the present disclosed example. Compare with the second embodiment as shown in FIG. 4, the automatic inkjet head cleaning method in the embodiment comprises the following steps.

Step S30: the control module 20 obtains the full inkjet head standard image of all the printed inkjet heads 12 after Step S206. In an embodiment, the 3D printer 1 passes the inspection, then controls all the inkjet heads 12 to print in the invalid area of at the building recess 102, takes photos of the printing result with the image capture module and uses the taken image as the full inkjet head standard image to save in the memory module 14.

As shown in FIG. 7A, each ink cartridge (i.e. the cyan ink cartridge, the magenta ink cartridge, the yellow ink cartridge and the black ink cartridge) for example is connected to 9 sets of inkjet heads 12. When all inkjet heads 12 print normally, the full inkjet head standard image should include 9 cyan ink marks 600-616, 9 magenta ink marks 620-636, 9 yellow ink marks 640-656 and 9 black ink marks 660-676, wherein each ink mark respectively corresponds to an inkjet head 12.

Step S32: the control module 20 matches the full inkjet head standard image with the inkjet head test image for calculating the no-printing inkjet head quantity. Specifically, when any inkjet head fails to print, the ink mark corresponding to the inkjet head 12 is not shown or the ink mark is in parts in the inkjet head test image taken in Step S206. As a result, the inkjet heads 12 failed to print are precisely identified by the control module 20 by matching the shape, the color, the quantity or the location of the ink marks between the full inkjet head standard image and the inkjet head test image. In addition, the control module 20 may enhance the cleaning operation on the identified inkjet heads 12 in the following cleaning procedures, or only execute the cleaning procedure on the identified inkjet heads 12.

For example, the inkjet head test image as shown in FIG. 7B only includes 7 cyan ink marks 602, 604, 608, 610, 612 and 616, 6 magenta ink marks 620, 624, 626, 630, 632 and 636, 4 yellow ink marks 642, 646, 648 and 650 and 5 black ink marks 660-666 and 672. After the full inkjet head standard image and the inkjet head test image are matched, the control module 20 identifies the multiple inkjet heads 12 fail to print including the multiple inkjet heads 12 correspond to the cyan ink marks 600, 606, the magenta ink marks 622, 628, 634, the yellow ink marks 640, 644, 652-56 and the black ink marks 668-650, 674-676.

Furthermore, the control module 20 calculates the maximum quantity of the no-printing and consecutively aligned inkjet heads is 4 (the four inkjet heads 12 correspond to black ink marks 668, 670, 674, 676) and uses the quantity as the final no-printing inkjet head quantity. Next, execute Step S210.

Figure 8:
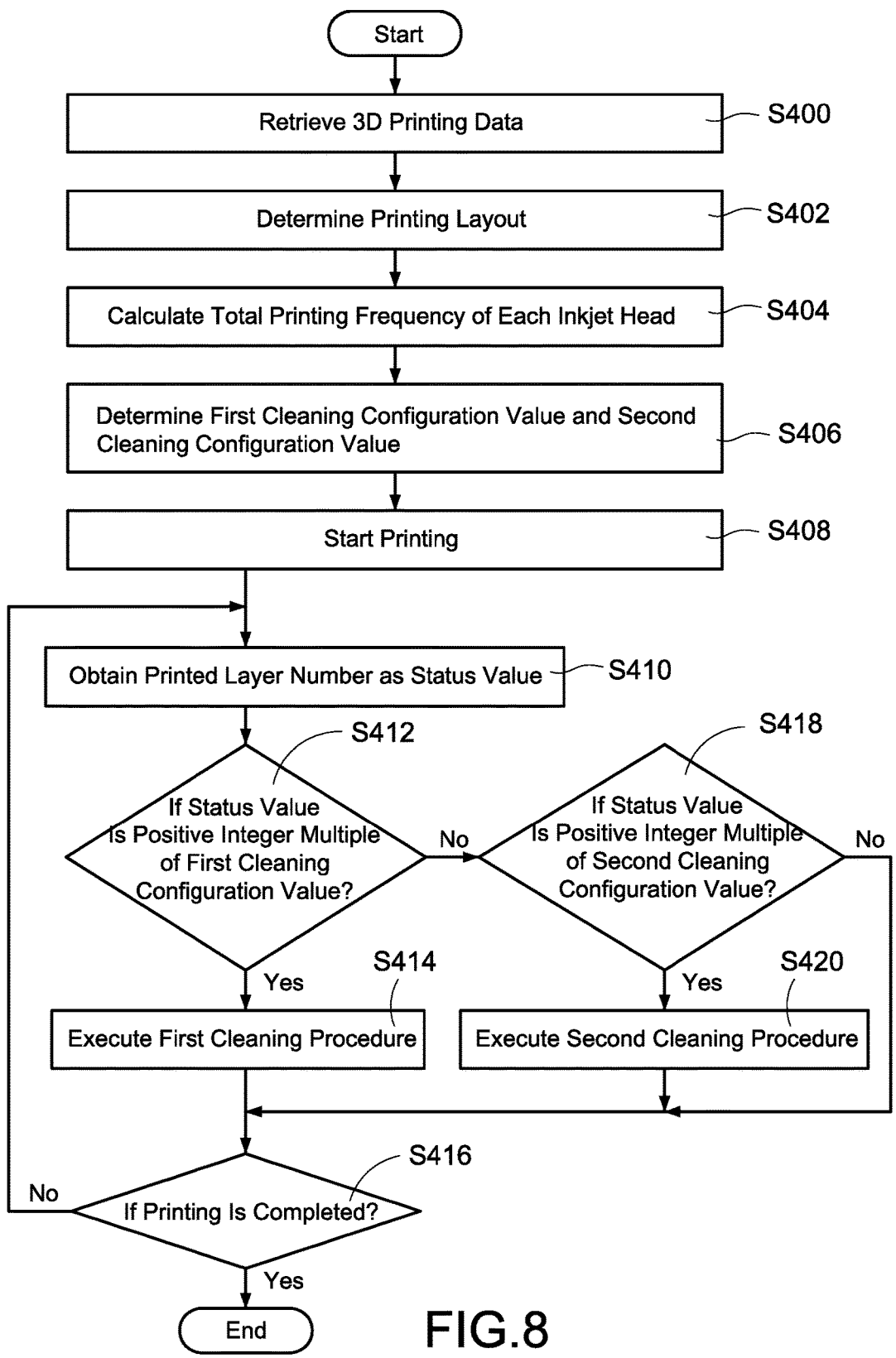
FIG. 8 is a flowchart of the automatic inkjet head cleaning method according to the fourth embodiment of the present disclosed example.

FIG. 8 is a flowchart of an automatic inkjet head cleaning method according to the first embodiment of the present disclosed example. In the embodiment, the Steps S400, S408, S414, S416 and S420 are respectively identical or similar to Steps S100, S102, S108, S110 and S114 as shown in the first embodiment in FIG. 3 and the details are not repeated here. The following description focuses on illustrating the differences between two embodiments. In the embodiment, the status value is printed layer quantity, and the first cleaning configuration value and the second cleaning configuration value correspond to the predetermined printed layer quantity of different cleaning required status. In addition, in the embodiment, the first cleaning configuration value is higher than the second cleaning configuration value, which means the first cleaning configuration value is the enhanced cleaning layer quantity, the second cleaning configuration value is the mild cleaning layer quantity, the first cleaning procedure is the enhanced cleaning procedure, and the second cleaning procedure is the mild cleaning procedure.

After the control module 2 executes Step S400, execute Step S402: the control module 20 determines the layout size of the 3D physical model to print according to the 3D printing data retrieved. In addition, the control module 20 further obtains the total layer number of the multiple slicing physical model of the 3D physical model to print according to the 3D printing data.

Step S404: the control module 20 calculates the total printing frequency of each inkjet head according to the determined layout size, total layer number and the printing resolution.

In an embodiment, the control module 20 multiple the layout size by the printing resolution to calculate the printing frequency of each layer by each inkjet head 12 and multiple the printing frequency of each layer by each inkjet head 12 by the total layer number to calculate the total printing frequency by each inkjet head 12.

For example, the layout size is 22 cm, the printing resolution is 1,600 dpi and the printing layer number is 50. The control module 20 calculates the printing frequency of each layer by each inkjet head 12 is 13,858 (i.e. 22 (cm) ÷2.54 (cm/inch)×1600 (dot/inch)). Then obtain the total printing frequency of each inkjet head 12 is 692, 900 (i.e. 13,858)50 (layers))×50 (layers)).

Step S406: the control module 20 determines the first cleaning configuration value (such as every 100 layers) and the second cleaning configuration value (such as every 3 layers), and saves the cleaning configuration values in the memory module 14, wherein the first cleaning configuration value is higher than the second cleaning configuration value. Next, execute Step S408.

After the control module 20 executes Step S408, execute 410: the control module retrieves the printed layer number by 3D printer 1 as the status value.

Step S412: the control module 20 determines if the status value retrieved is a positive integer multiple of the first cleaning configuration value.

Specifically, when the control module 20 determines that the status value is a positive integer multiple of the first cleaning configuration value (such as 100 layers, 200 layers, 300 layers . . . ), the control module 20 stops printing the 3D physical model and executes the first cleaning procedure (Step S414), and continues to print the 3D physical model after the cleaning procedure is completed and determines if the printing is completed (S416).

If the control module 20 determines that the status value is not a positive integer multiple of the first cleaning configuration value, the control module 20 executes Step S418: the control module 20 determines if the status value is a positive integer multiple of the second cleaning configuration value.

Specifically, when the control module 20 determines that the status value is a positive integer multiple of the second cleaning configuration value (such as 3 layers, 6 layers, 9 layers . . . ), the control module 20 stops printing the 3D physical model and executes the second cleaning procedure (Step S420), and continues to print the 3D physical model after the cleaning procedure is completed and determines if the printing is completed (S416).

The disclosed example determines if cleaning procedures are executed according to the printed layer number, which effectively simplifies the detection process and effectively reduces the time as well as the computing resource required for performing the detection.

Figure 9:
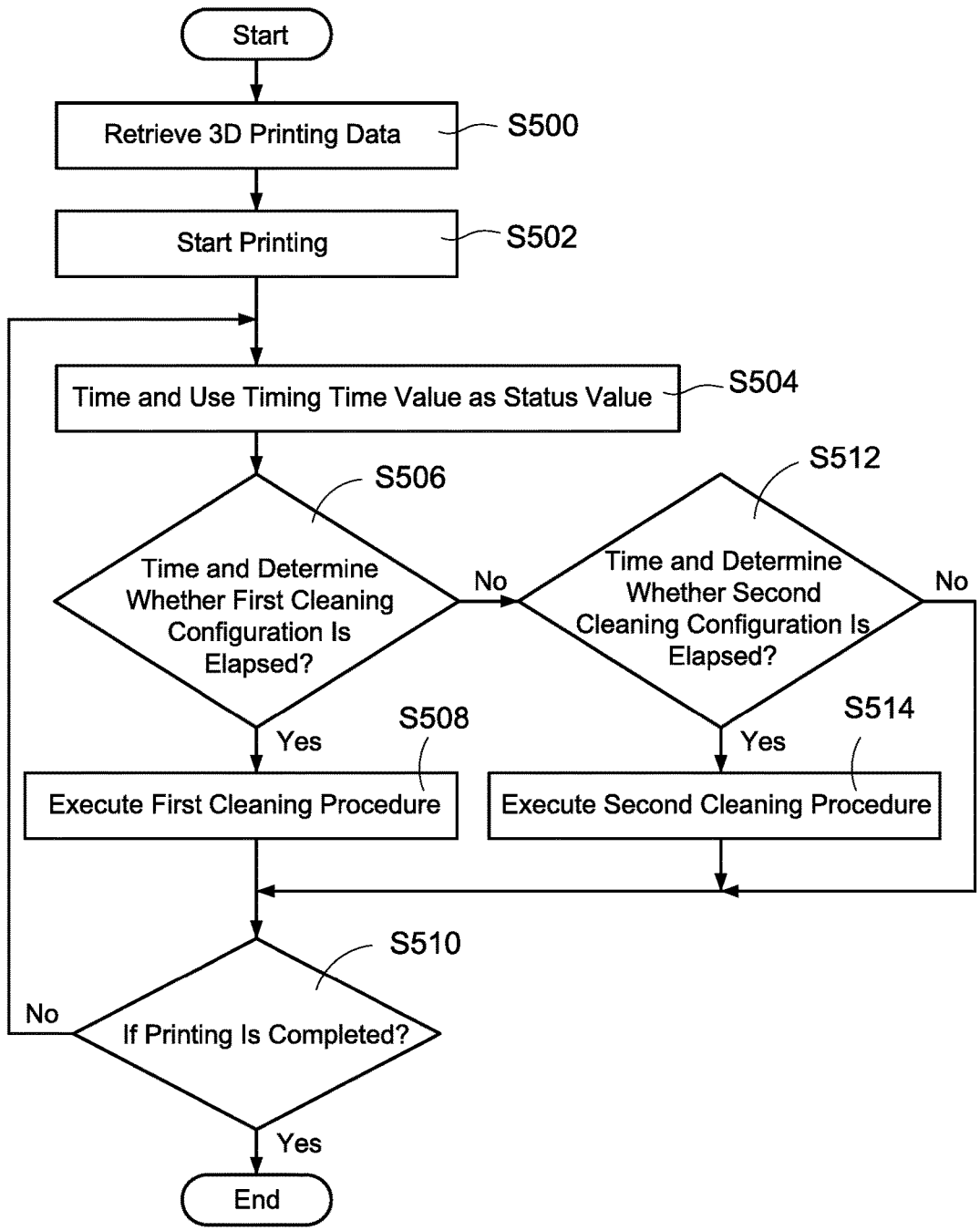
FIG. 9 is a flowchart of the automatic inkjet head cleaning method according to the fifth embodiment of the present disclosed example.

FIG. 9 is a flowchart of an automatic inkjet head cleaning method according to the first embodiment of the present disclosed example. In the embodiment, the Steps S500, S502 and S510 are respectively identical or similar to Steps S100, S102, and S110 as shown in the first embodiment in FIG. 3 and the details are not repeated here. The following description focuses on illustrating the differences between two embodiments. In the embodiment, the status value is the current timer time value, and the first cleaning configuration value and the second cleaning configuration value respectively correspond to the predetermined cleaning time value of different cleaning required status. In addition, in the embodiment, the first cleaning configuration value is higher than the second cleaning configuration value, which means the first cleaning configuration value is the enhanced cleaning time value, the second cleaning configuration value is the mild cleaning time value, the first cleaning procedure is the enhanced cleaning procedure, and the second cleaning procedure is the mild cleaning procedure.

After the control module 20 executes Step S500, S50, execute Step S504: the control module starts timing with the cleaning timer (not shown in FIG. 1) upon starting printing, the current time of the cleaning timer is used as the status value.

Step S506: the control module 20 times and determines if the first cleaning configuration value is elapsed. Specifically, the control module 20 determines if the status value equals to the first cleaning configuration value (such as 30 minutes), or equals to a positive integer multiple of the first cleaning configuration value (such as 30 minutes, 60 minutes, 90 minutes . . . ).

If the first cleaning time value is elapsed, executes Step S508: the control module 20 stops printing the 3D physical model and executes the first cleaning procedure. In addition, the control module 20 continues to print the 3D physical model after the cleaning procedure is completed and determines if the printing is completed (S510).

If the control module 20 times and determines the first cleaning configuration value is not elapsed, executes Step S512: the control module 20 times and determines if the second cleaning configuration value is elapsed. Specifically, in the embodiment, the control module 20 determines if the status value equals to the second cleaning configuration value (such as 5 minutes), or equals to a positive integer multiple of the second cleaning configuration value (such as 5 minutes, 10 minutes, 15 minutes . . . ).

If the second cleaning time value is elapsed, executes Step S514: the control module 20 stops printing the 3D physical model and executes the second cleaning procedure. In addition, the control module 20 continues to print the 3D physical model after the cleaning procedure is completed and determines if the printing is completed (S510).

In an embodiment, the control module uses two sets of cleaning timers for timing at the same time (for example, uses the first cleaning timer and the second cleaning timer), and uses the timer time values by the two sets of the cleaning timers as the status values.

In addition, in Step S506, the control module 20 executes Step S508 upon the timing result of the first cleaning timer indicates that the first cleaning configuration value is elapsed. In Step S512, the control module 20 executes Step S514 upon the timing result of the second cleaning timer indicates that the second cleaning configuration value is elapsed.

Also, the control module 20 resets the first cleaning timer for starting to time the first cleaning configuration value before or after execute Step S508; and resets the second cleaning timer for starting to time the second cleaning configuration value before or after execute Step S514.

When the water in inks or adhesives evaporates, the inks or the adhesives may clog on the inkjet heads 12. The disclosed example executes different cleaning procedures of different levels according to different time values which effectively avoids the inkjet heads 12 from clogging and effectively improves the printing quality and reduces the printing failure rate.

Figure 10:
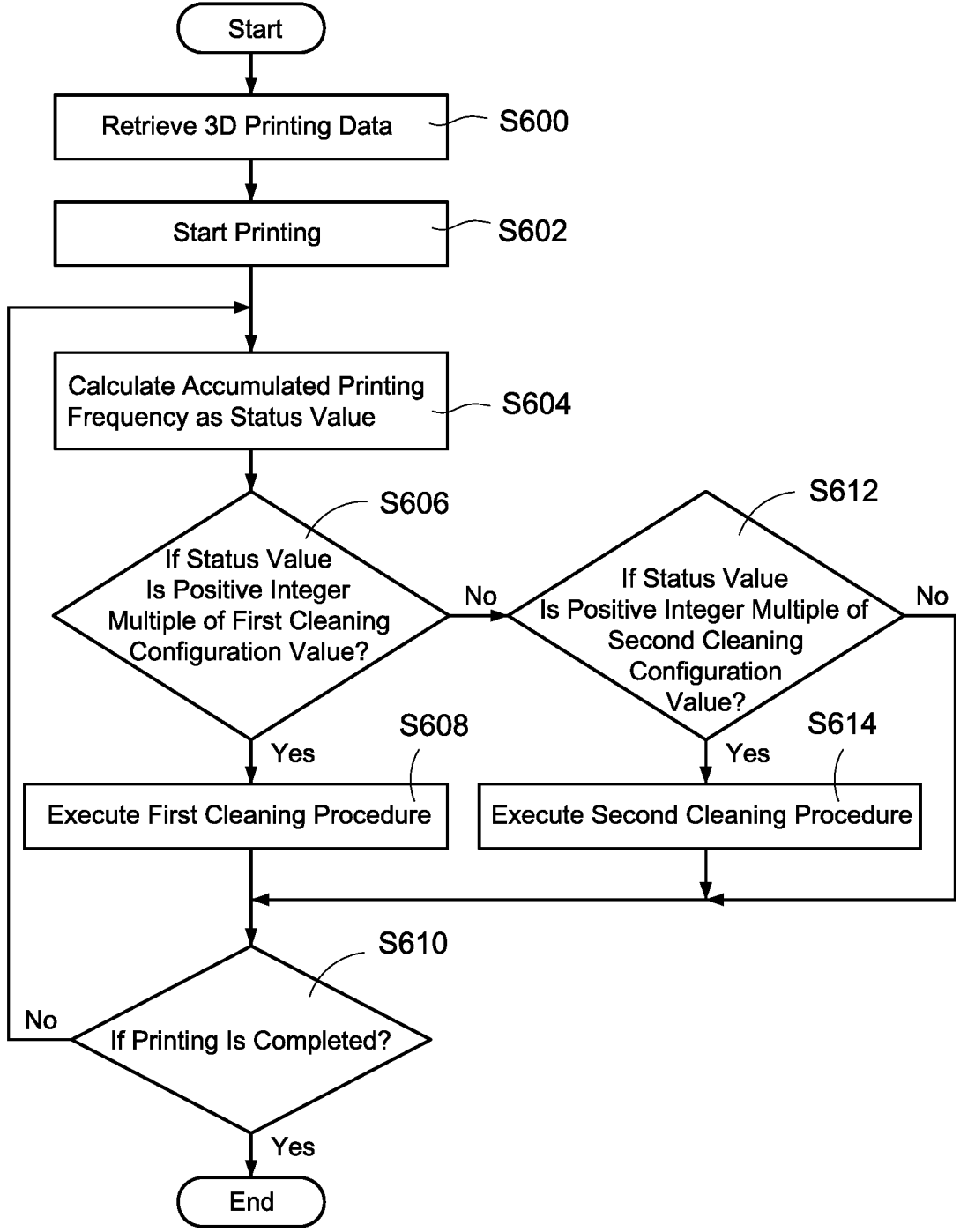
FIG. 10 a flowchart of the automatic inkjet head cleaning method according to the sixth embodiment of the present disclosed example.

FIG. 10 is a flowchart of an automatic inkjet head cleaning method according to the first embodiment of the present disclosed example. In the embodiment, the Steps S600, S602, S608, S610 and S614 are respectively identical or similar to Steps S100, S102, S108, S110 and S114 as shown in the first embodiment in FIG. 3 and the details are not repeated here. The following description focuses on illustrating the differences between two embodiments. In the embodiment, the status value is the current accumulated printing frequency of each inkjet head, the first cleaning configuration value and the second cleaning configuration value respectively correspond to the predetermined printing frequency of different cleaning required status. In addition, in the embodiment, the first cleaning configuration value is more than the second cleaning configuration value, which means the first cleaning configuration value is the enhanced cleaning printing frequency, the second cleaning configuration value is the mild cleaning printing frequency, the first cleaning procedure is the enhanced cleaning procedure, and the second cleaning procedure is the mild cleaning procedure, but the scope is not limited thereto.

After the control module 20 executes Step S600, S602, executes Step S604: the control module 20 calculates the accumulated printing frequency of each inkjet head as the status value.

Step S606: the control module 20 determines of the status value is the positive integer multiple of the predetermined first cleaning configuration value (such as 300,000 times).

Specifically, when the control module 20 determines that the status value is a positive integer multiple of the first cleaning configuration value (such as 300,000 times, 600,000 times, 900,000 times . . . ), the control module 20 stops printing the 3D physical model and executes the first cleaning procedure (Step S608), and continues to print the 3D physical model after the first cleaning procedure is completed and determines if the printing is completed (S610).

If the control module 20 determines that the status value is not a positive integer multiple of the first cleaning configuration value, the control module 20 executes Step S612: the control module 20 determines if the status value is a positive integer multiple of the predetermined second cleaning configuration value (such as 30,000 times).

Specifically, when the control module 20 determines that the status value is a positive integer multiple of the predetermined second cleaning configuration value (such as 30,000 times, 60,000 times, 90,000 times . . . ), the control module 20 stops printing the 3D physical model and executes the second cleaning procedure (Step S614), continues to print the 3D physical model after the second cleaning procedure is completed and determines if the printing is completed (S610).

Each time when the ink is printed on the powders, the powders may bounce and stick to the inkjet heads which leads to clogging. The disclosed example executes cleaning procedures of different levels according to the accumulated printing frequency which effectively avoids the inkjet heads 12 from clogging and effectively improves the printing quality and reduces the printing failure rate.

Figure 11B:
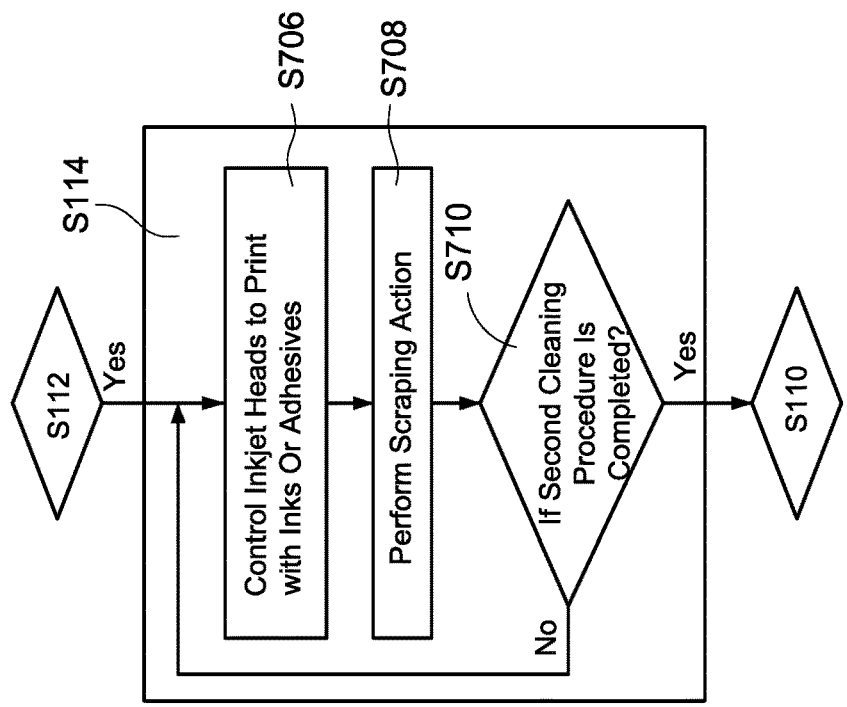
FIG. 11B is a schematic diagram of the second cleaning procedure according to the seventh embodiment of the present disclosed example.
Figure 11A:
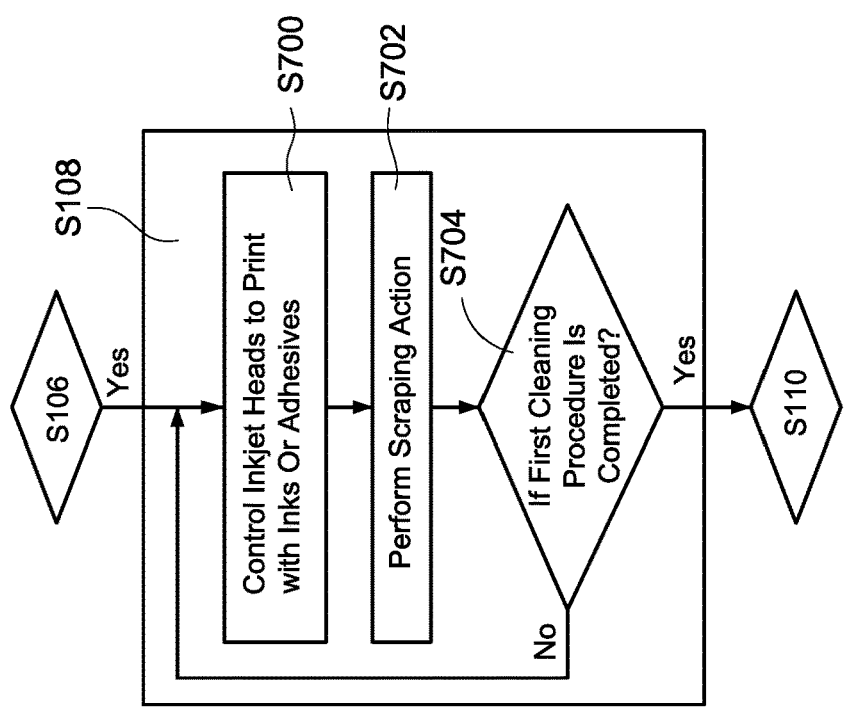
FIG. 11A is a schematic diagram of the first cleaning procedure according to the seventh embodiment of the present disclosed example.

Refer to FIGS. 3, 11A and 11B, FIG. 11A is a schematic diagram of the first cleaning procedure according to the seventh embodiment of the present disclosed example and FIG. 11B is a schematic diagram of the second cleaning procedure according to the seventh embodiment of the present disclosed example. Compare with the first embodiment as shown in FIG. 3, the Step S108 comprises Steps S700-S704 and Step S114 comprises Steps S706-S710 in the automatic inkjet head cleaning method of the embodiment.

The control module 20 determines that the first cleaning configuration value is satisfied, executes Step S700: the control module 20 controls all or parts of inkjet heads to print with inks or adhesives in order to clear the ink nozzles or the ink pipes.

In an embodiment, the control module 20 controls the inkjet heads 12 to print with inks or adhesives of the first ink quantity (more) in order to clean the ink nozzles or the ink pipes.

Step S702: the control module 20 controls the inkjet heads 12 to perform one or several scrapping actions in order to scrap the powder or ink residues on the inkjet heads 12.

Step S704: the control module 20 determines if the first cleaning procedure is completed. In an embodiment, the control module 20 judges the first cleaning procedure is completed after determining that the cleaning operation (i.e. Step S700-S702) are executed repeatedly and the accumulated frequency is up to the predetermined first cleaning frequency (such as 5 times).

If the control module 20 determines the first cleaning procedure is not completed, the Step S700 is re-executed. Or the control module 20 executes Step S110.

The control module 20 determines that the second cleaning configuration value is satisfied, executes Step S706: the control module 20 controls all or parts of inkjet heads to print with inks or adhesives.

In an embodiment, the control module 20 controls the inkjet heads 12 to print with inks or adhesives of the second ink quantity (less) such that the cleaning cost is lower.

Step S708: the control module 20 controls the inkjet heads 12 to perform one or several scrapping actions.

Step S710: the control module 20 determines if the second cleaning procedure is completed. In an embodiment, the control module 20 judges the second cleaning procedure is completed after determining that the cleaning operation (i.e. Step S706-S708) are executed repeatedly and the accumulated frequency is up to the predetermined second cleaning frequency (such as 2 times), wherein the first cleaning frequency is higher than the second cleaning frequency.

If the control module 20 determines the second cleaning procedure is not completed, the Step S700 is re-executed. Or the control module 20 executes Step S110.

Figure 12:
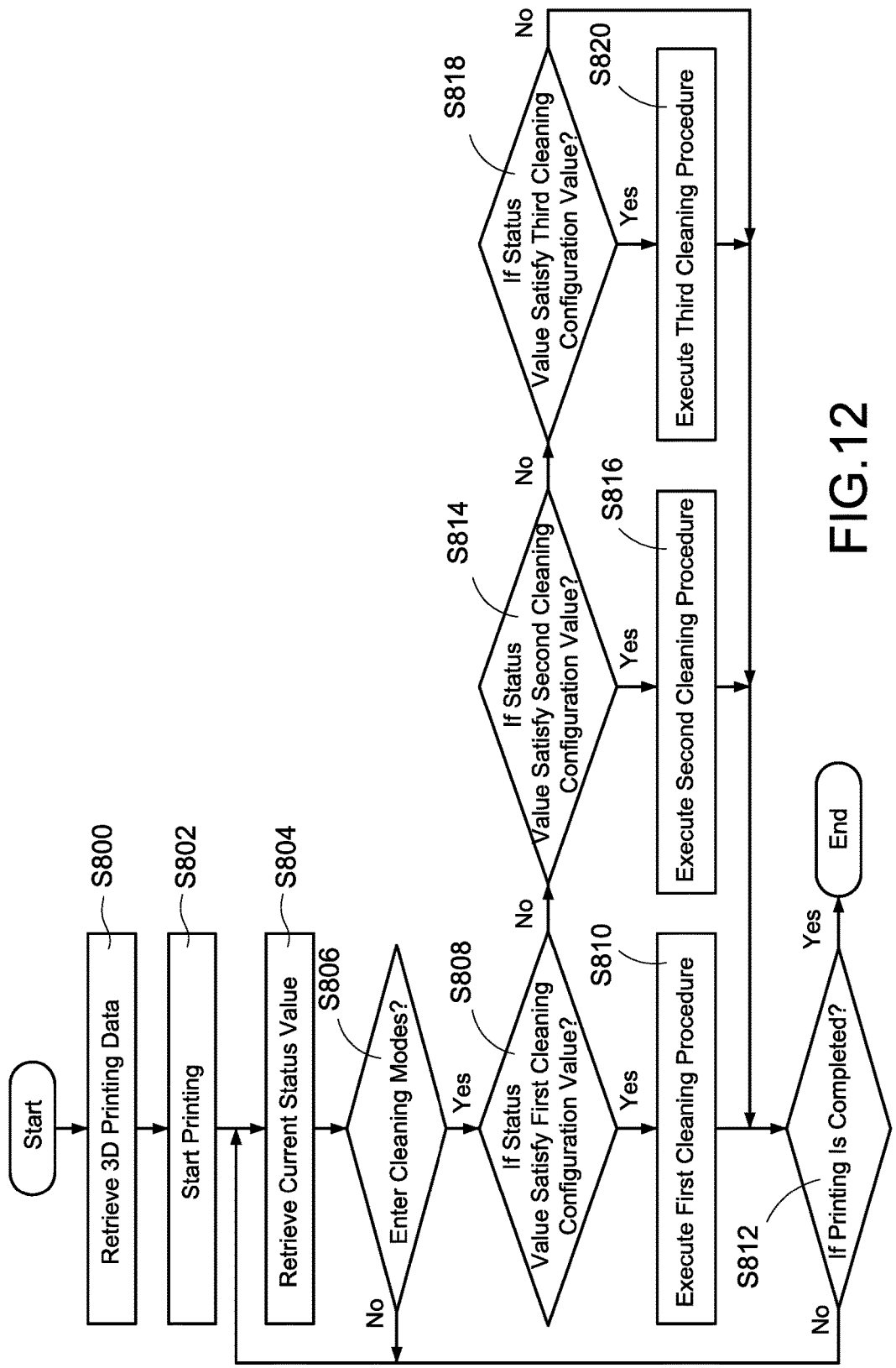
FIG. 12 a flowchart of the automatic inkjet head cleaning method according to the seventh embodiment of the present disclosed example.

FIG. 12 is a flowchart of an automatic inkjet head cleaning method according to the first embodiment of the present disclosed example. In the embodiment, the Steps S800, S802, S804, S808, S810, S812, S818 and S820 are respectively identical or similar to Steps S100, S102, 104, S106, S108, S110, S112 and S114 as shown in the first embodiment in FIG. 3 and the details are not repeated here. Compare with the first embodiment as shown in FIG. 3, the first embodiment only provides the cleaning procedures of two levels and the automatic inkjet head cleaning method of the embodiment comprises the cleaning procedures of three levels. In the embodiment, the first cleaning configuration value, the second cleaning configuration value, and the third cleaning configuration value respectively correspond to the predetermined status values of different cleaning required status. In addition, in the embodiment, the first cleaning configuration value is higher than the third cleaning configuration value and the third cleaning configuration value is higher than the second cleaning configuration value, which means the first cleaning configuration value is the enhanced cleaning configuration value, the second cleaning configuration value is the moderate cleaning configuration value, the third cleaning configuration value is the mild cleaning configuration value, the first cleaning procedure is the enhanced cleaning procedure, and the second cleaning procedure is the moderate cleaning procedure and the third cleaning procedure is the mild cleaning procedure.

After the control module 20 executes Steps S800-S804, it executes Step S806: the control module 20 determines if enters into the cleaning modes. Specifically, the control module determines if the current status value satisfies the predetermined cleaning condition value (the cleaning condition value is but not limited to the powder diameter ration, the time length value, the printed layer number or the printing frequency).

If the control module 20 determines the status value does satisfy the cleaning condition, then enters the cleaning modes to execute Step S808: the control module 20 determines if the status value satisfies the first cleaning configuration value.

If the status value satisfies the first cleaning configuration value, the control module 20 executes Step S810 to execute the first cleaning procedure. Next, execute Step S812.

If the status value does not satisfy the first cleaning configuration value, then executes Step S814: the control module 20 determines if the status value satisfies the third cleaning configuration value.

The control module 20 executes Step S816: the control module 20 executes moderate cleaning procedure for cleaning all or parts of the inkjet heads when determining the status value satisfies the third cleaning configuration value.

If the status value does not satisfy the third cleaning configuration value, then the control module 20 executes Step S818: the control module 20 determines if the status value satisfies the second cleaning configuration value.

If the status value satisfies the second cleaning configuration value, the control module 20 executes Step S820 to execute the second cleaning procedure. Next, execute Step S812.

If the status value does not satisfy the second cleaning configuration value, the control module 20 executes Step S812.

The present disclosed example effectively resolve inkjet head clogging of different levels to maintain the stable printing quality of inkjet heads 12 via offering cleaning procedures of different levels and determining if the cleaning conditions for executing the cleaning procedures are satisfied.

As the skilled person will appreciate, various changes and modifications can be made to the described embodiment. It is intended to include all such variations, modifications and equivalents which fall within the scope of the present disclosed example, as defined in the accompanying claims.

What is claimed is:

1. An automatic inkjet head cleaning method applicable to a powder bed and inkjet 3D printer comprising a plurality of inkjet heads and a powder-laying module, the automatic inkjet head cleaning method comprising following steps:
    a) controlling the plurality of the inkjet heads and the powder-laying module to print a 3D physical model according to 3D printing data at the powder bed and inkjet 3D printer;
    b) controlling all of the inkjet heads to print on a building recess of the powder bed and inkjet 3D printer during printing;
    c) taking a photo of the building recess via an image capture module to obtain an inkjet heads test image;
    d) calculating a no-printing inkjet head quantity according to the inkjet head test image;
    e) calculating a powder particle diameter ratio as a status value according to the no-printing inkjet head quantity, a printing resolution and a powder diameter;
    f) executing a first cleaning procedure for cleaning all or parts of the inkjet heads when the status value satisfies a first cleaning configuration value; and
    g) executing a second cleaning procedure for cleaning all or parts of the inkjet heads when the status value satisfies a second cleaning configuration value, wherein a first execute time period used in executing the first cleaning procedure is longer than a second execute time period used in executing the second cleaning procedure.

2. The automatic inkjet head cleaning method of claim 1, wherein the step f) is configured to stop printing the 3D physical model and executing the first cleaning procedure, and continue to print the 3D physical model after the first cleaning procedure is completed; the step g) is configured to stop printing the 3D physical model and execute the second cleaning procedure, and continue to print the 3D physical model after the second cleaning procedure is completed.

3. The automatic inkjet head cleaning method of claim 1, wherein the step c) is configured to perform the first cleaning procedure after the status value satisfies a cleaning condition value and the first cleaning configuration value; and the step g) is configured to perform the second cleaning procedure after the status value satisfies the cleaning condition value and the second cleaning configuration value.

4. The automatic inkjet head cleaning method of claim 1, wherein the step f) is configured to execute the first cleaning procedure when determining the status value is not lower than the first cleaning configuration value; and the step g) is configured to perform the second cleaning procedure when determining the status value is not lower than the second cleaning configuration value, wherein the second cleaning configuration value is not lower than 1 and is lower than the first cleaning configuration value.

5. The automatic inkjet head cleaning method of claim 1, wherein the step d) is configured to calculate a maximum quantity of the multiple inkjet heads which are no-printing or partial printing inkjet heads and aligned consecutively as the no-printing inkjet head quantity.

6. The automatic inkjet head cleaning method of claim 1, wherein the Step d) further comprises:
    d1) obtaining a full inkjet head standard image corresponding to a status of all of the inkjet heads had printed; and
    d2) matching the full inkjet head standard image with the inkjet head test image for calculating the no-printing inkjet head quantity.

7. The automatic inkjet head cleaning method of claim 1, wherein the first cleaning procedure is repeatedly controlling all or parts of the inkjet heads to print with the ink or the adhesive and/or perform a scraping action until completing a first cleaning frequency; the second cleaning procedure is repeatedly controlling all or parts of the inkjet heads to print with the ink or the adhesive and/or perform a scraping action until completing a second cleaning frequency, wherein the first cleaning frequency is higher than the second cleaning frequency.

8. The automatic inkjet head cleaning method of claim 1, wherein the method further comprises a step h) stopping printing the 3D physical model and executing the third cleaning procedure to clean all or parts of the inkjet heads when determining the status value satisfying a third cleaning configuration value which is both lower than the first cleaning configuration value and higher than the second cleaning configuration value, and continuing to print the 3D physical model after the third cleaning procedure is completed; wherein a third execute time period used in executing the third cleaning procedure is lower than the first execute time period and longer than the second execute time period.

9. An automatic inkjet head cleaning method applicable to a powder bed and inkjet 3D printer comprising a plurality of inkjet heads and a powder-laying module, the automatic inkjet head cleaning method comprising following steps:
    a) controlling the plurality of the inkjet heads and the powder-laying module to print a 3D physical model according to 3D printing data at the powder bed and inkjet 3D printer;
    b) retrieve a printed layer quantity of the powder bed and inkjet 3D printer as a status value during printing;
    c) executing a first cleaning procedure for cleaning all or parts of the inkjet heads when determining the status value as a positive integer multiple of a first cleaning configuration value; and
    d) executing a second cleaning procedure for cleaning all or parts of the inkjet heads when the status value is determined as a positive integer multiple of a second cleaning configuration value, wherein a first execute time period used in executing the first cleaning procedure is longer than a second execute time period used in executing the second cleaning procedure, the first cleaning configuration value is higher than the second cleaning configuration value.

10. The automatic inkjet head cleaning method of claim 9, wherein the step c) is configured to stop printing the 3D physical model and executing the first cleaning procedure, and continue to print the 3D physical model after the first cleaning procedure is completed; the step d) is configured to stop printing the 3D physical model and execute the second cleaning procedure, and continue to print the 3D physical model after the second cleaning procedure is completed.

11. The automatic inkjet head cleaning method of claim 9, wherein the step c) is configured to perform the first cleaning procedure after the status value satisfies a cleaning condition value and the first cleaning configuration value; and the step d) is configured to perform the second cleaning procedure after the status value satisfies the cleaning condition value and the second cleaning configuration value.

12. The automatic inkjet head cleaning method of claim 9, wherein the method further comprises following steps before the step a):
    a01) determining a layout size according to the 3D printing data;
    a02) calculating a total printing frequency of each inkjet head according to the layout size, a total layer number and a printing resolution; and
    a03) determining the first cleaning configuration value and the second cleaning configuration value according to the total printing frequency of each inkjet head.

13. The automatic inkjet head cleaning method of claim 9, wherein the first cleaning procedure is repeatedly controlling all or parts of the inkjet heads to print with the ink or the adhesive and/or perform a scraping action until completing a first cleaning frequency; the second cleaning procedure is repeatedly controlling all or parts of the inkjet heads to print with the ink or the adhesive and/or perform a scraping action until completing a second cleaning frequency, wherein the first cleaning frequency is higher than the second cleaning frequency.

14. The automatic inkjet head cleaning method of claim 9, wherein the method further comprises a step e) stopping printing the 3D physical model and executing the third cleaning procedure to clean all or parts of the inkjet heads when determining the status value satisfying a third cleaning configuration value which is both lower than the first cleaning configuration value and higher than the second cleaning configuration value, and continuing to print the 3D physical model after the third cleaning procedure is completed; wherein a third execute time period used in executing the third cleaning procedure is lower than the first execute time period and longer than the second execute time period.

15. An automatic inkjet head cleaning method applicable to a powder bed and inkjet 3D printer comprising a plurality of inkjet heads and a powder-laying module, the automatic inkjet head cleaning method comprising following steps:
    a) controlling the plurality of the inkjet heads and the powder-laying module to print a 3D physical model according to 3D printing data at the powder bed and inkjet 3D printer;
    b) retrieving a status value continuously or intermittently during printing;
    c) executing a first cleaning procedure for repeatedly controlling all or parts of the inkjet heads to print with the ink or the adhesive and/or perform a scraping action until completing a first cleaning frequency when the status value satisfies a first cleaning configuration value; and d) executing a second cleaning procedure for repeatedly controlling all or parts of the inkjet heads to print with the ink or the adhesive and/or perform a scraping action until completing a second cleaning frequency when the status value satisfies a second cleaning configuration value, wherein a first execute time period used in executing the first cleaning procedure is longer than a second execute time period used in executing the second cleaning procedure, the first cleaning frequency is higher than the second cleaning frequency.

16. The automatic inkjet head cleaning method of claim 15, wherein the step c) is configured to stop printing the 3D physical model and executing the first cleaning procedure, and continue to print the 3D physical model after the first cleaning procedure is completed; the step d) is configured to stop printing the 3D physical model and execute the second cleaning procedure, and continue to print the 3D physical model after the second cleaning procedure is completed.

17. The automatic inkjet head cleaning method of claim 15, wherein the step c) is configured to perform the first cleaning procedure after the status value satisfies a cleaning condition value and the first cleaning configuration value; and the step d) is configured to perform the second cleaning procedure after the status value satisfies the cleaning condition value and the second cleaning configuration value.

18. The automatic inkjet head cleaning method of claim 15, wherein the step b) is configured to start timing upon printing via a cleaning timer, and use the timer time value of the cleaning timer as the status value; the step c) is configured to execute the first cleaning procedure when the status value equals to the first cleaning configuration value; and the Step d) is configured to executing the second cleaning procedure when the status value equals to the second cleaning configuration value.

19. The automatic inkjet head cleaning method of claim 15, wherein the Step b) is configured to calculate an accumulated printing frequency of each inkjet head as the status value; the step c is configured to execute the first cleaning procedure when the status value is a positive integer multiple of the first cleaning configuration value; and the step d) is configured to execute the second cleaning procedure when the status value is a positive integer multiple of the second cleaning configuration value.

20. The automatic inkjet head cleaning method of claim 15, wherein the method further comprises a step e) stopping printing the 3D physical model and executing the third cleaning procedure to clean all or parts of the inkjet heads when determining the status value satisfying a third cleaning configuration value which is both lower than the first cleaning configuration value and higher than the second cleaning configuration value, and continuing to print the 3D physical model after the third cleaning procedure is completed; wherein a third execute time period used in executing the third cleaning procedure is lower than the first execute time period and longer than the second execute time period.

* * * * *